(12) United States Patent
Kamen et al.

(10) Patent No.: US 8,266,656 B2
(45) Date of Patent: Sep. 11, 2012

(54) METHOD FOR MAKING SELECTIONS IN SEARCH CRITERIA IN TV EPGS

(75) Inventors: Yakov Kamen, Cupertino, CA (US); Dan Kinkinis, Saratoga, CA (US); Brian Kohne, San Jose, CA (US)

(73) Assignee: JLB Ventures LLC, Washington, DC (US)

( * ) Notice: Subject to any disclaimer, the term of this patent is extended or adjusted under 35 U.S.C. 154(b) by 2288 days.

(21) Appl. No.: 10/159,543

(22) Filed: May 31, 2002

(65) Prior Publication Data

US 2003/0023976 A1      Jan. 30, 2003

Related U.S. Application Data

(60) Provisional application No. 60/296,663, filed on Jun. 6, 2001.

(51) Int. Cl.
  *G06F 3/00* (2006.01)
  *H04N 5/44* (2011.01)
(52) U.S. Cl. .............................. 725/53; 725/39; 348/734
(58) Field of Classification Search .................... 725/53, 725/39, 46, 45; 348/734
  See application file for complete search history.

(56) References Cited

U.S. PATENT DOCUMENTS

| | | | |
|---|---|---|---|
| 5,526,034 A | 6/1996 | Hoarty et al. | |
| 5,550,578 A | 8/1996 | Hoarty et al. | |
| 5,652,628 A * | 7/1997 | Toyoshima et al. | 725/56 |
| 5,671,411 A * | 9/1997 | Watts et al. | 725/43 |
| 5,798,785 A * | 8/1998 | Hendricks et al. | 725/46 |
| 5,808,608 A * | 9/1998 | Young et al. | 725/52 |
| 5,912,664 A * | 6/1999 | Eick et al. | 715/810 |
| 6,005,565 A * | 12/1999 | Legall et al. | 715/721 |
| 6,005,631 A * | 12/1999 | Anderson et al. | 725/53 |
| 6,034,678 A | 3/2000 | Hoarty et al. | |
| 6,100,883 A | 8/2000 | Hoarty | |
| 6,130,726 A * | 10/2000 | Darbee et al. | 348/734 |
| 6,154,203 A * | 11/2000 | Yuen et al. | 725/52 |
| 6,173,316 B1 * | 1/2001 | De Boor et al. | 709/218 |
| 6,205,582 B1 | 3/2001 | Hoarty | |
| 6,317,883 B2 * | 11/2001 | Marics | 725/56 |
| 6,545,722 B1 * | 4/2003 | Schultheiss et al. | 348/552 |
| 6,732,372 B2 * | 5/2004 | Tomita et al. | 725/47 |
| 6,882,299 B1 * | 4/2005 | Allport | 341/176 |
| 7,111,320 B1 * | 9/2006 | Novak | 725/139 |
| 2001/0024566 A1 | 9/2001 | Mankovitz | 386/83 |
| 2002/0053086 A1 * | 5/2002 | Vanderpohl et al. | 725/78 |
| 2002/0075231 A1 * | 6/2002 | Martino et al. | 345/158 |
| 2003/0088869 A1 * | 5/2003 | Swix et al. | 725/44 |
| 2004/0073947 A1 * | 4/2004 | Gupta | 725/134 |
| 2004/0093616 A1 * | 5/2004 | Johnson | 725/53 |
| 2005/0193414 A1 * | 9/2005 | Horvitz et al. | 725/46 |

\* cited by examiner

*Primary Examiner* — Brian Pendleton
*Assistant Examiner* — Jason K Lin
(74) *Attorney, Agent, or Firm* — Banner & Witcoff, Ltd.

(57) ABSTRACT

An embodiment of the present invention provides a television electronic programming guide that allows users to combine multiple search criteria within a single search. The electronic program guide receives a television program search criteria set containing a plurality of search criteria and provides a search result set containing television programs that meet the television program search criteria set. The search criteria in the television program search criteria set may be combined in various ways to form a complex search. For one embodiment the search criteria are combined in a Boolean AND combination. One embodiment of the present invention provides a television electronic programming guide that allows users to dynamically add or remove search criteria from a programming guide search without initiating a new programming guide search. The electronic program guide receives a revision to the television program search criteria set, and revises the search result based upon the revision.

22 Claims, 4 Drawing Sheets

METHOD FOR MAKING SELECTIONS IN SEARCH CRITERIA IN TV EPGS

CLAIM OF PRIORITY

This application is related to, and hereby claims the benefit of, provisional application No. 60/296,663, which was filed Jun. 6, 2001 and is hereby incorporated by reference.

FIELD OF THE INVENTION

Embodiments of the present invention relate generally to onscreen television program guides and more specifically to a method for selecting search criteria.

BACKGROUND OF THE INVENTION

Onscreen television programming guides commonly referred to as electronic programming guides (EPGs) provide a user with the ability to create a search of available television programs that presents a specified subset of the available programs. The search may return available programs in a specified area of interest (e.g., comedies), or may return programs available from a specified broadcast station or programs available at a specified time, for example.

FIG. 1 illustrates aspects of an EPG display in accordance with the prior art. EPG display 100 includes a search criteria window 120. EPG display 101 includes a search result window 130. Typically, a user will enter search criteria on one display (e.g., EPG display 100), and view the search results on a following display (e.g., EPG display 101).

For example, as shown in EPG display 100, the search criterion "Children" has been selected from the search criteria window 120. The EPG search is conducted based upon the specified criteria, and the result is displayed on a subsequent EPG display. For example, search result window 130 displays the station number and title of all children programs available. The user may then select a desired program. Typically, up and down arrows 131 and 132 are used to move a selection marker, such as a pointer or highlight, in the channel or programming selection domain.

The prior EPG presents the drawback in that if a user desires to change or refine the search criteria, the user must return to a previous screen and reset the search criteria. The new search is then conducted against the entire set of available programs. Another drawback is that present EPGs do not allow a search based upon the combination of multiple search criteria.

A further convention, typically maintained in prior art EPGs is that entering numbers from a TV remote control device causes the selection marker to jump to the TV channel whose number corresponds to the number entered on the remote control device.

However, if a search is refined, the number of presented items is already limited, so being able to enter a channel number to navigate to a selection does not present any advantage. Furthermore, a specific channel may or may not be represented in a specific search result, so jumping to a channel number entered by the user may not lead to an item in the search result, and hence may be counterproductive in the search.

SUMMARY

Embodiments of the present invention provide methods wherein a user may combine two or more search criteria for an electronic program guide search. The electronic program guide receives a television program search criteria set containing a plurality of search criteria and provides a search result set containing television programs that meet the television program search criteria set. For one embodiment, the television program search criteria set may be dynamically revised by adding or deleting search criteria. The electronic program guide receives a revision to the television program search criteria set, and revises the search result based upon the revision.

Other features and advantages of the present invention will be apparent from the accompanying drawings, and from the detailed description, that follows below.

BRIEF DESCRIPTION OF THE DRAWINGS

Embodiments of the present invention are illustrated by way of example, and not limitation, by the figures of the accompanying drawings in which like references indicate similar elements and in which.

DETAILED DESCRIPTION

An embodiment of the present invention provides a television electronic programming guide that allows users to dynamically add or remove search criteria from a programming guide search without initiating a new programming guide search. For one embodiment, the electronic programming guide allows a user to combine multiple search criteria within a single search. For one embodiment one or more search parameters may be dynamically altered without affecting remaining search parameters.

In the following detailed description of exemplary embodiments of the present invention, numerous specific details are set forth in order to provide a thorough understanding of the described embodiments of the present invention. However, it will be apparent to one skilled in the art that alternative embodiments of the present invention may be practiced without these specific details. In some instances, well-known structures and devices are shown in block diagram form, rather than in detail, in order to avoid obscuring the description of exemplary embodiments of the present invention.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Figure 1:
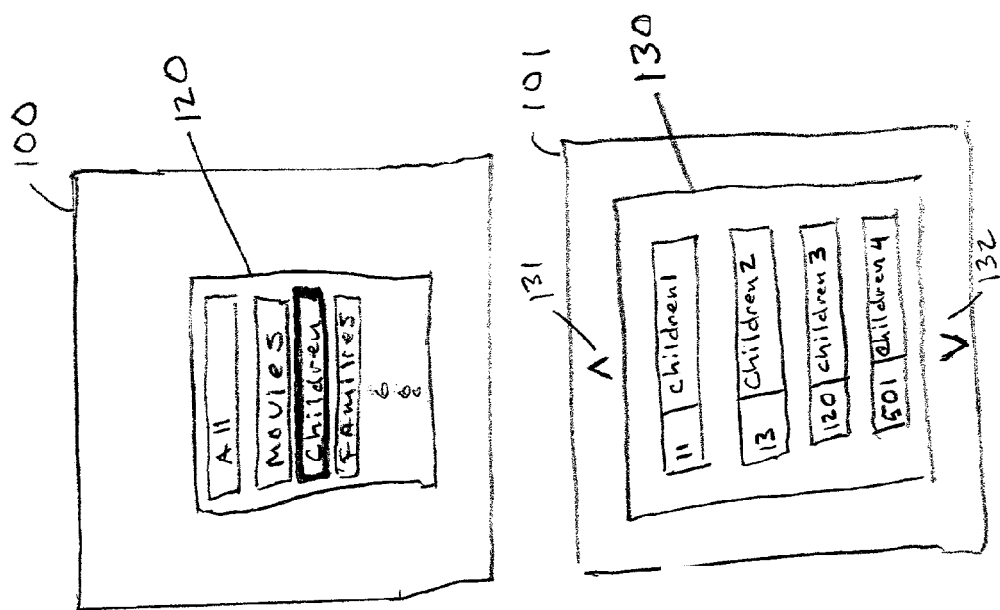
FIG. 1 illustrates aspects of an EPG display in accordance with the prior art.
Figure 2:
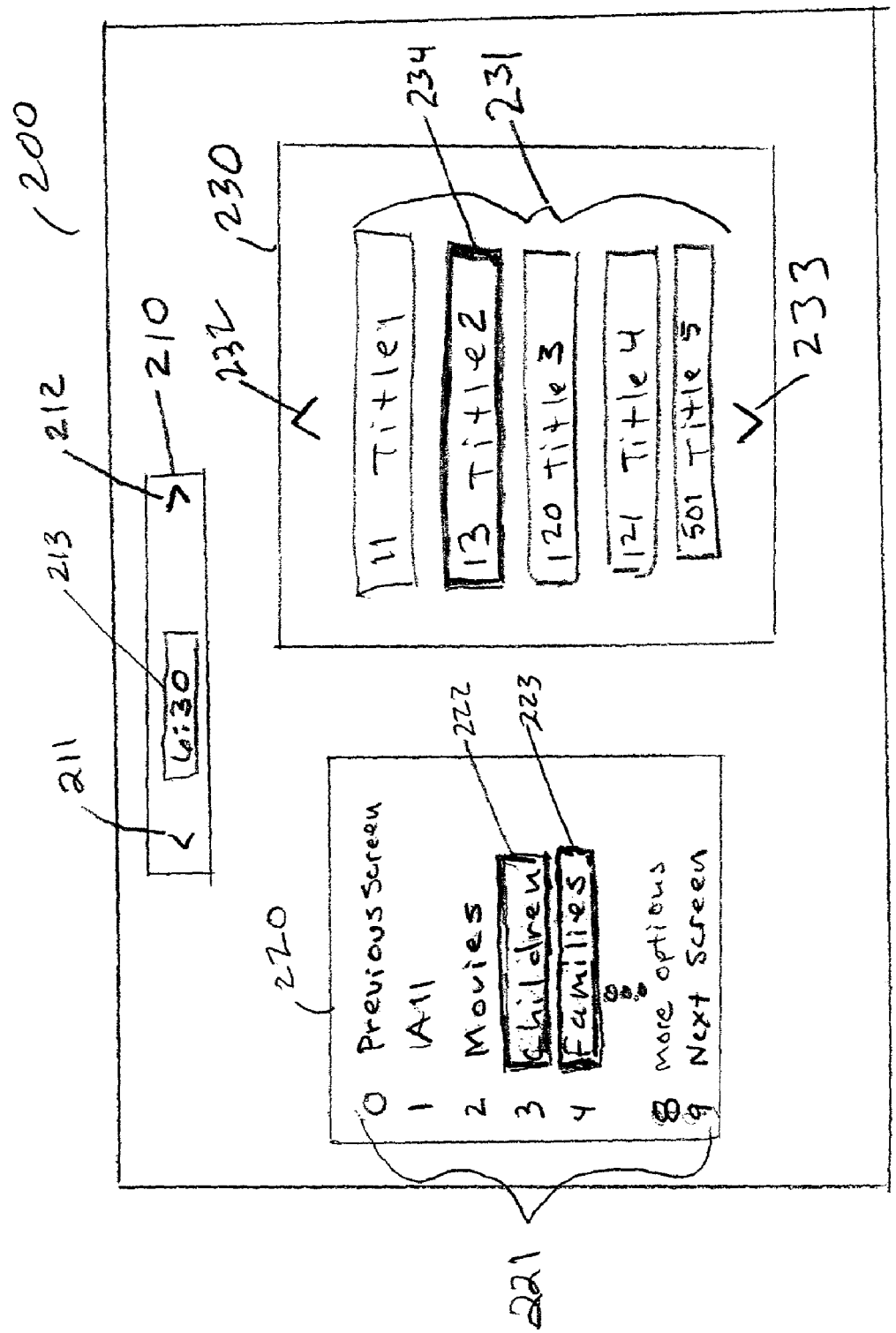
FIG. 2 illustrates aspects of a television electronic programming guide (EPG) in accordance with one embodiment of the present invention.

FIG. 2 illustrates aspects of a television electronic programming guide (EPG) in accordance with one embodiment of the present invention. EPG display 200 includes time navigation bar 210. Typically, EPGs maintain an operating convention that selecting the left or right arrow moves a selection marker, such as a pointer or highlighter, in the time selection domain. Time navigation bar 210 includes left navigation arrow 211 and right navigation arrow 212, which are used to specify a search time 213. For example, as shown the time selected is 6:30.

EPG display 200 also includes a search criteria window 220 containing a search criteria set 221. In one embodiment, each criterion is represented by a corresponding single digit. One or more of the search criteria may be selected to create a specific search. For example, selection markers highlight elements 222 and 223, which are elements 3 and 4, respectively, of search criteria set 231. The resulting search will be a combination of search criteria 3, Children, and search criteria 4, Family. For one embodiment the combination results in a Boolean "AND" operation for the selected search criteria. The selection of one or more search criteria from search criteria set 221 of search criteria window 220 and initiation of a search after criteria selection is finished may be implemented in various ways as known in the art. For one embodiment the selection is preformed using a preprogrammed television remote control device.

The EPG display 200 also contains search result window 230 that displays a search result set 231. Search result set 231 contains the channel number and program name for programs meeting the selected search criteria. Program selection marker arrows 232 and 233 allow the user to move a program selection marker up and down, respectively, within the search result set 231. For example, search result 234 is a channel program listing, which in this example is channel 13, highlighted by the program selection marker. Once the selection marker comes to the bottom or the top of the screen, the list may scroll over to a following page of search results. In alternative embodiments, a page up/page down function can also be used to scroll to the next or previous page of search results.

For one embodiment, each of the desired search criteria can be selected by pressing a single button on a TV remote control device. One or more search criteria may be selected, thus allowing the user to enter the equivalent of a combined complex search without having to deal with the complexity of entering parameters and arguments of the search. For example, a user may create a Boolean search for search criteria Children and Family by pressing the number 3 key and the number 4 key on a TV remote control device. For one embodiment, a selected search criteria may be deselected by depressing the corresponding numbered key of the TV remote control device.

Upon the dynamic selection (or deselection) of search criteria, the search result set 231 is updated to reflect the current search parameters.

For one embodiment, the search criteria set 231 is displayed on multiple screens by allowing overflow of the criteria list onto "previous" or "next" screens. For example, using the number 9 key to go to the next screen and the number 0 key to return to the previous screen, allows a user to have access to a large selection of program search criteria.

Additionally, as shown, an "All" selection may be included in search criteria set 221. Selection of "All" would result in a search by time parameter 213 of all programming criteria. For alternative embodiments, an "All" selection may be included in a channel or program search domain, rather than in a time search domain.

Figure 3:
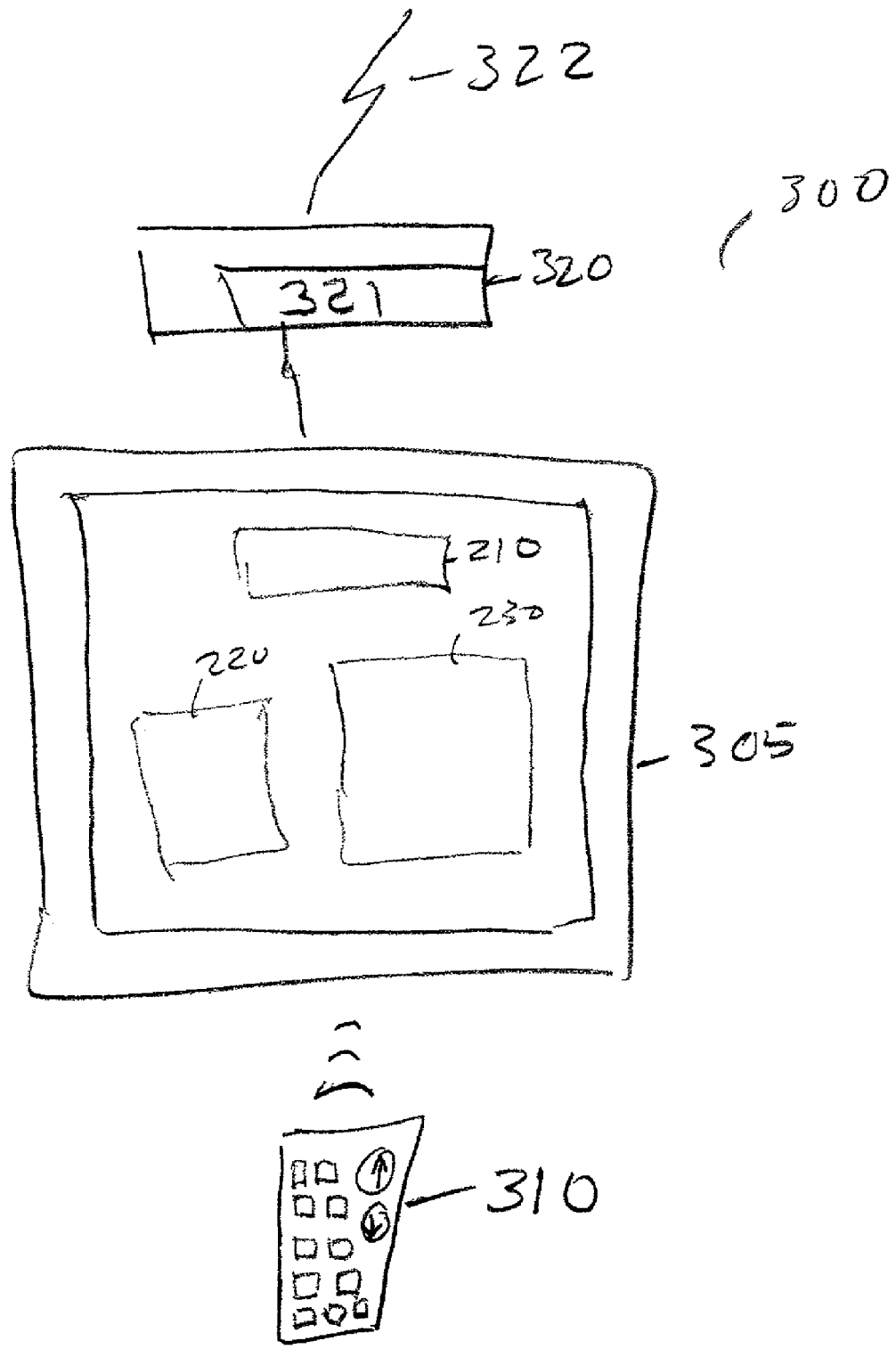
FIG. 3 illustrates a simplified block diagram of an exemplary television system for use with one embodiment of the present invention.

FIG. 3 illustrates a simplified block diagram of an exemplary television system for use with one embodiment of the present invention. System 300, shown in FIG. 3, includes a television set 305 coupled to set-top box 320. Set-top box 320 may typically contain a processor and memory, the memory having software 321 stored upon it for implementing the present invention. Network connection 322 may be analog or digital cable, fiber optic, digital subscriber line (DSL), aerial, wireless cable, fiber, local multi-channel distribution systems (LMDS), etc., all of which are well-known in the art. System 300 also includes remote control 310, typically controlling the set-top box 320. In alternative embodiments, remote control 310 may be integrated with a TV, VCR, DVD player, or other presentation devices or combinations thereof.

Figure 4:
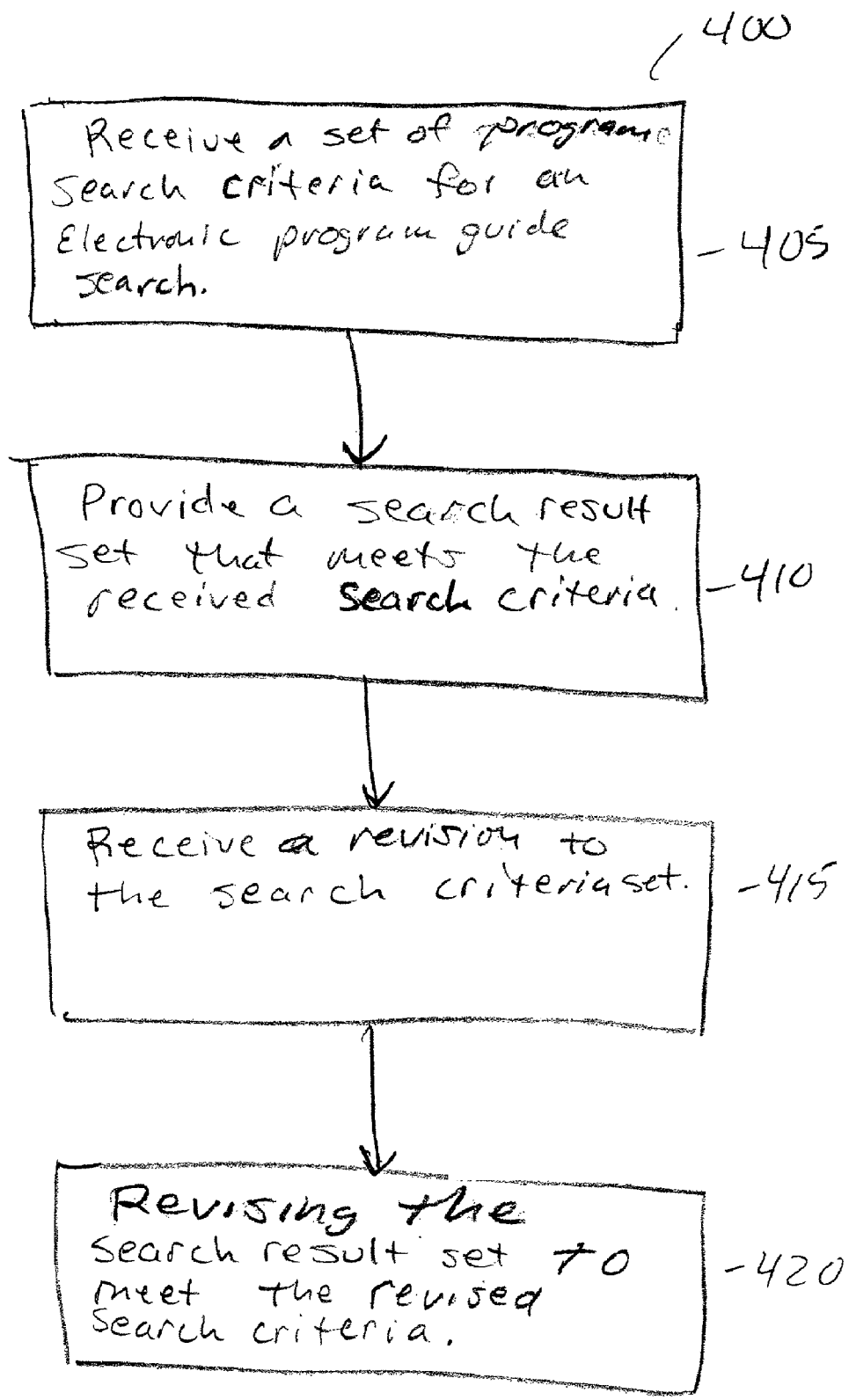
FIG. 4 is a process flow diagram of a process in accordance with one embodiment of the present invention.

FIG. 4 is a process flow diagram of a process in accordance with one embodiment of the present invention. Process 400 begins at operation 405 in which an EPG receives one or more search criteria. The search criteria may be selected as described above in reference to FIG. 2. If more than one search criteria is received, the search criteria are combined. For example, in one embodiment the search criteria are combined using a Boolean "AND" operation to provide search results that meet all of the search criteria. In alternative embodiments, the search criteria may be combined in other ways.

At operation 410, the EPG provides a search result set. The search result set contains all of the programs that meet the search criteria received at operation 405.

At operation 415, the EPG receives a revision to the search criteria. This update could take the form of additional search criteria or one or more of the original search criteria being removed (e.g., deselected as described above). The revision may be a combination of adding search criteria and removing one or more of the original search criteria.

At operation 420 the search result set is revised to reflect the updated search criteria. The search result set from the original search is modified to meet the current specified search criteria. For example, if search criteria are added, then only a subset of the search result set that meets the new criteria is retained as the updated search result set. If a search criteria is removed, then the search result set may be enlarged to include those programs which meet the reduced search criteria.

Thus, one embodiment of the present invention provides a method by which a user dynamically modifies EPG search criteria and receives modified search results.

The operations described above in reference to FIG. 4 (receiving EPG search criteria, providing a search result set, receiving updated search criteria, and providing an updated search result set) may be implemented by hardware and/or software contained within the viewer's set-top box 320. For example, a set-top box may include one or more processors that can execute code or instructions stored within a machine-readable medium that may also be included within the set-top box.

The machine-readable medium may include a mechanism that provides (i.e., stores and/or transmits) information in a form readable by a machine such as computer or digital processing device. For example, a machine-readable medium may include a read only memory (ROM), random access memory (RAM), magnetic disk storage media, optical storage media or flash memory devices. The code or instructions may be represented by carrier-wave signals, infrared signals, digital signals, and by other like signals.

While the invention has been described bed in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
receiving, by an electronic program guide of a computing device, a television program search criteria set containing a plurality of search criteria, each of the search criteria corresponding to a button on a push-button control device, wherein selection of a first button at an initial time corresponds to selection of a first criteria and selection of the first button at subsequent time after the initial time corresponds to deselection of the first criteria, and selection of a second button, different from the first button, at its initial time corresponds to selection of a second criteria and selection of the second button at its subsequent time after its initial time corresponds to deselection of the second criteria;
providing a search result set containing television programs that meet the combination of the selected criteria of the television program search criteria set; and
simultaneously displaying on the same screen the television program search criteria set containing the plurality of search criteria and the search result set.

2. The method of claim 1 further comprising:
receiving in the electronic program guide, a revision to the television program search criteria set; and
revising the search result set corresponding to the revision to the television program search criteria set.

3. The method of claim 2, wherein the revision to the television program search criteria set includes taking an action selected from the group consisting of selecting one or more additional search criteria, deselecting one or more search criteria, and combinations thereof.

4. The method of claim 3, wherein each of the one or more search criteria is deselected by pressing the corresponding button on the push-button control device.

5. One or more non-transitory computer readable media storing instructions that, when executed by a processor, cause the processor to:
display an onscreen television program guide comprising: display an onscreen television program guide, the television program guide including a search criteria window containing a plurality of search criteria, each criterion corresponding to a set of television programs, each criteria capable of being selected for a search such that two or more selected criteria form a search criteria set, wherein each of the search criteria corresponds to a button on a push-button control device, wherein selection of a first button at an initial time corresponds to selection of a first criteria and selection of the first button at a subsequent time after the initial time corresponds to deselection of the first criterion, and selection of a second button, different from the first button, at its initial time corresponds to selection of a second criterion and selection of the second button at its subsequent time after its initial time corresponds to deselection of the second criterion; and a search result window to display a list of television programs corresponding to the combination of the selected criteria of the search criteria set, wherein the search criteria window and the search result window are displayed simultaneously on the same screen.

6. The non-transitory computer readable media of claim 5, wherein the search criteria set can be dynamically revised such that the search result window displays a revised list of television programs corresponding to the revised search criteria set.

7. The non-transitory computer readable media of claim 6, wherein revising the search criteria set includes selecting additional search criteria and deselecting previously selected search criteria.

8. One or more non-transitory computer readable media storing instructions that, when executed by a processor, cause the processor to perform a method, comprising:
displaying a plurality of search criteria, each of the search criteria corresponding to a button on a push-button control device, wherein selection of a first button at an initial time corresponds to selection of a first criteria and selection of the first button at a subsequent time after the initial time corresponds to deselection of the first criteria, and selection of a second button, different from the first button, at its initial time corresponds to selection of a second criteria and selection of the second button at its subsequent time after its initial time corresponds to deselection of the second criteria;
receiving a selection of at least two search criteria from the displayed plurality of search criteria;
comparing the combination of the at least two selected search criteria to a list of available television programs; and
providing a search result set containing television programs that meet the at least two selected search criteria, wherein providing the search result set includes simultaneously displaying the search result set and the plurality of search criteria on the same screen.

9. The one or more non-transitory computer-readable media of claim 8, wherein the plurality of search criteria are combined such that a resultant search criterion is the Boolean AND combination of each of the plurality of search criteria.

10. The one or more non-transitory computer-readable media of claim 9, wherein the method further comprises:
receiving a revision to the plurality of search criteria; and
revising the search result set corresponding to the revision.

11. The one or more non-transitory computer-readable media of claim 10, wherein the revision to the plurality of search criteria includes taking an action selected from the group consisting of selecting one or more additional search criteria, deselecting one or more search criteria, and combinations thereof.

12. The one or more non-transitory computer-readable media of claim 11, wherein each of the one or more search criteria is deselected by pressing the corresponding button on the push-button control device.

13. A system comprising:
a television display screen;
an electronic program guide capable of being displayed on the television display screen, the electronic program guide having a search criteria window containing a plurality of search criteria, each of the search criteria corresponding to a button on a push-button control device, the push-button control device being configured to select search criteria such that two or more selected criteria form a search criteria set, wherein selection of a first button at an initial time corresponds to selection of a first criteria and selection of the first button at a subsequent time after the initial time corresponds to deselection of the first criteria, and selection of a second button, different from the first button, at its initial time corresponds to selection of a second criteria and selection of the second button at its subsequent time after its initial time corresponds to deselection of the second criteria; and
a search result window to display a list of television programs corresponding to the combination of the selected criteria of the search criteria set, wherein the search result window and the search criteria window are simultaneously displayed on the same screen of the television display screen.

14. The system of claim 13, wherein the search criteria set can be dynamically revised such that the search result window displays a revised list of television programs corresponding to the revised search criteria set.

15. The system of claim 14, wherein revising the search criteria set includes selecting additional search criteria and deselecting previously selected search criteria.

16. The method of claim 1, wherein the step of receiving, in an electronic program guide, a television program search criteria set containing a plurality of search criteria further includes receiving a search criteria set including an all selection.

17. The method of claim 16, wherein the all selection includes a second search parameter.

18. The method of claim 17, wherein the second search parameter is a time parameter.

19. The onscreen television program guide of claim 5, wherein each of the search criteria of the plurality of search criteria corresponds to a single numeral that is used for selection of the search criteria.

20. The onscreen television program guide of claim 5, wherein the search result set further includes a channel number for each of the television programs displayed in the search result window.

21. The onscreen television program guide of claim 6, wherein the search result set further includes a program name for each of the television programs displayed in the search result window.

22. The method of claim 1, wherein displaying the search criteria set in the step of simultaneously displaying the television program search criteria set containing the plurality of search criteria and the search result set includes displaying the search criteria and corresponding buttons.

* * * * *